United States Patent
Hyde et al.

(10) Patent No.: US 9,238,452 B2
(45) Date of Patent: Jan. 19, 2016

(54) LOCK ASSEMBLY

(75) Inventors: Fred Hyde, Warwickshire (GB); David Kelly, Warwickshire (GB); John Morton, Warwickshire (GB); Mark Findlay, Warwickshire (GB)

(73) Assignee: Camcon Auto Limited, Cambridgeshire (GB)

( * ) Notice: Subject to any disclaimer, the term of this patent is extended or adjusted under 35 U.S.C. 154(b) by 124 days.

(21) Appl. No.: 13/988,152

(22) PCT Filed: Nov. 25, 2011

(86) PCT No.: PCT/GB2011/052325
§ 371 (c)(1),
(2), (4) Date: May 17, 2013

(87) PCT Pub. No.: WO2012/069849
PCT Pub. Date: May 31, 2012

(65) Prior Publication Data
US 2013/0220763 A1  Aug. 29, 2013

(30) Foreign Application Priority Data
Nov. 26, 2010 (GB) .................................. 1020092.1

(51) Int. Cl.
*F16H 63/38* (2006.01)
*B60T 1/00* (2006.01)
*F16H 63/34* (2006.01)

(52) U.S. Cl.
CPC ............ *B60T 1/005* (2013.01); *F16H 63/3433* (2013.01); *F16H 63/3475* (2013.01)

(58) Field of Classification Search
USPC ............... 188/31, 69, 154–164; 192/69.7, 71, 192/219.5, 219.6; 74/473.24
See application file for complete search history.

(56) References Cited

U.S. PATENT DOCUMENTS 2,974,752 A * 3/1961 Howard .......................... 188/69
4,614,126 A 9/1986 Edelen et al.
(Continued)

FOREIGN PATENT DOCUMENTS

CN 101113781 A 1/2008
DE 43 34 031 A1 4/1995
(Continued)

OTHER PUBLICATIONS

Espacenet, English Machine Translation of DE4334031A1, published Apr. 13, 1995, retrieved from http://worldwide.espacenet.com on May 3, 2013 (6 pages).
(Continued)

*Primary Examiner* — Christopher Schwartz
(74) *Attorney, Agent, or Firm* — Wood, Herron & Evans, LLP

(57) ABSTRACT

A lock assembly for use in automotive and industrial transmission systems comprises: an actuator (2) having an impeller (6) movable between two rest positions by energizing the actuator, wherein the impeller is retained in each of the two rest positions by passive magnetic forces generated by the actuator; a locking arrangement (10, 22; 42, 52; 62, 64; 70, 74; 80, 96) switchable between a first configuration in which rotation of a shaft is unimpeded by the locking arrangement and a second configuration in which rotation of said shaft is blocked by the locking arrangement; and a linkage (14, 16; 44, 46; 61, 88) between the impeller and the locking arrangement, wherein the assembly is arranged such that in one of the impeller rest positions, the locking arrangement is in its first configuration and said shaft is freely rotatable, and in the other of the impeller rest positions, the locking arrangement is urged towards and into its second configuration.

20 Claims, 14 Drawing Sheets

(56) References Cited

U.S. PATENT DOCUMENTS

| | | | |
|---|---|---|---|
| 4,709,793 A | 12/1987 | Sakakibara et al. | |
| 6,510,934 B2* | 1/2003 | Arakawa | 192/219.5 |
| 6,598,621 B1 | 7/2003 | Wygnanski | |
| 8,240,448 B2* | 8/2012 | Hongawara et al. | 192/219.5 |
| 8,387,759 B2* | 3/2013 | Prix | 188/69 |
| 8,689,946 B2* | 4/2014 | Villeneuve | 188/69 |
| 2001/0042669 A1* | 11/2001 | Arakawa | 192/219.5 |
| 2002/0092710 A1* | 7/2002 | Oppitz et al. | 188/69 |
| 2004/0237694 A1* | 12/2004 | Lindenschmidt et al. | 74/473.21 |
| 2007/0283735 A1* | 12/2007 | Schweiher et al. | 70/245 |
| 2008/0173121 A1 | 7/2008 | Kimura et al. | |
| 2011/0198190 A1* | 8/2011 | Steinhauser et al. | 192/219.5 |

FOREIGN PATENT DOCUMENTS

| | | | |
|---|---|---|---|
| DE | 100 10 040 A1 | 9/2001 | |
| DE | 10 2008 029 570 A1 | 12/2009 | |
| DE | 10 2008 054 466 A1 | 6/2010 | |
| DE | 10 2009 018 122 A1 | 10/2010 | |
| DE | 10 2009 021 300 A1 | 11/2010 | |
| EP | 1 247 708 A1 | 10/2002 | |
| EP | 1 586 797 A2 | 10/2005 | |
| EP | 2 163 792 A1 | 3/2010 | |
| GB | 2 342 504 A | 4/2000 | |
| GB | 2 342 782 A | 4/2000 | |
| GB | 2 380 065 A | 3/2003 | |
| GB | 2467378 A | 8/2010 | |
| JP | 57140262 A | 8/1982 | |
| JP | 5997327 A | 6/1984 | |
| JP | 2008128445 A | 6/2008 | |
| JP | 2008523334 A | 7/2008 | |
| JP | 2008180250 A | 8/2008 | |
| WO | 2006061413 A1 | 6/2006 | |
| WO | 2008/044049 A2 | 4/2008 | |
| WO | 2010/067110 A1 | 6/2010 | |

OTHER PUBLICATIONS

Espacenet, English Machine Translation of DE10010040A1, published Sep. 6, 2001, retrieved from http://worldwide.espacenet.com on May 3, 2013 (11 pages).

Espacenet, English Machine Translation of EP1247708A1, published Oct. 9, 2002, retrieved from http://worldwide.espacenet.com on May 3, 2013 (9 pages).

Espacenet, English Machine Translation of DE102008029570A1, published Dec. 31, 2009, retrieved from http://worldwide.espacenet.com on May 3, 2013 (10 pages).

Espacenet, English Machine Translation of EP2163792A1, published Mar. 17, 2010, retrieved from http://worldwide.espacenet.com on May 3, 2013 (5 pages).

Espacenet, English Machine Translation of DE102008054466A1, published Jun. 17, 2010, retrieved from http://worldwide.espacenet.com on May 3, 2013 (8 pages).

Espacenet, English Machine Translation of DE102009018122A1, published Oct. 14, 2010, retrieved from http://worldwide.espacenet.com on May 3, 2013 (20 pages).

Espacenet, English Machine Translation of DE102009021300A1, published Nov. 18, 2010, retrieved from http://worldwide.espacenet.com on May 3, 2013 (18 pages).

United Kingdom Intellectual Property Office, Patents Act 1977: Search Report under Section 17, Application No. GB1020092.1, dated Aug. 3, 2011 (1 page).

United Kingdom Intellectual Property Office, Patents Act 1977: Search Report under Section 17, Application No. GB1120384.1, dated Mar. 17, 2012 (2 pages).

European Patent Office, International Search Report and Written Opinion of the International Searching Authority, International Application No. PCT/GB2011/052325, Apr. 27, 2012 (17 pages).

Espacenet, English Machine Translation of Abstract for JPS57140262A, published on Aug. 30, 1982, retrieved from http://worldwide.espacenet.com on Aug. 11, 2015 (2 pages).

Espacenet, English Machine Translation of Abstract for JPS5997327A, published on Jun. 5, 1984, retrieved from http://worldwide.espacenet.com on Aug. 11, 2015 (2 pages).

Espacenet, English Machine Translation of CN101113781A, published on Jan. 30, 2008, retrieved from http://worldwide.espacenet.com on Aug. 11, 2015 (7 pages).

Espacenet, English Machine Translation of JP2008128445A, published on Jun. 5, 2008, retrieved from http://worldwide.espacenet.com on Aug. 11, 2015 (11 pages).

Espacenet, English Machine Translation of JP2008523334A, published on Jul. 3, 2008, retrieved from http://worldwide.espacenet.com on Aug. 11, 2015 (10 pages).

Espacenet, English Machine Translation of JP2008180250A, published on Aug. 7, 2008, retrieved from http://worldwide.espacenet.com on Aug. 11, 2015 (14 pages).

\* cited by examiner

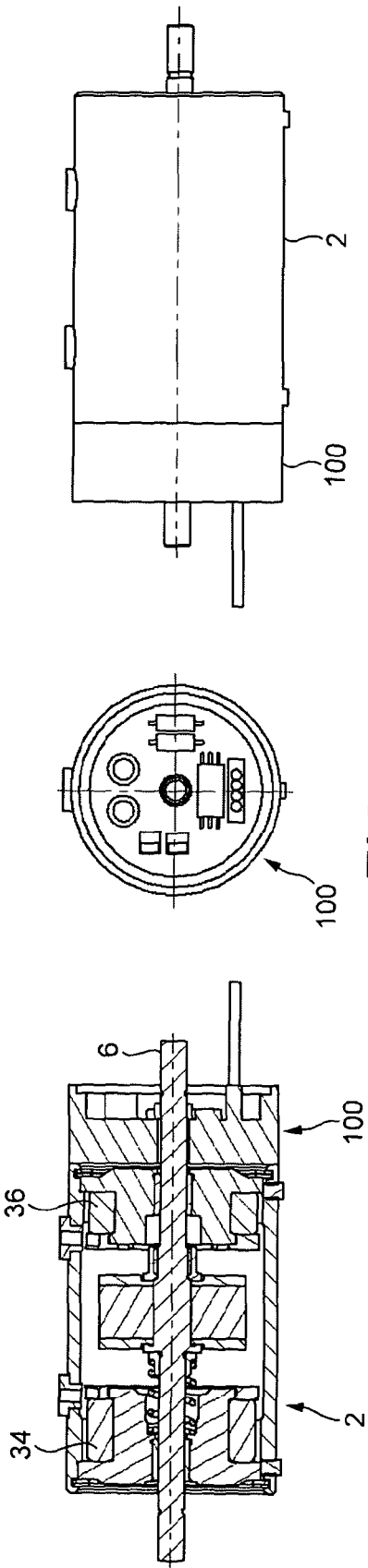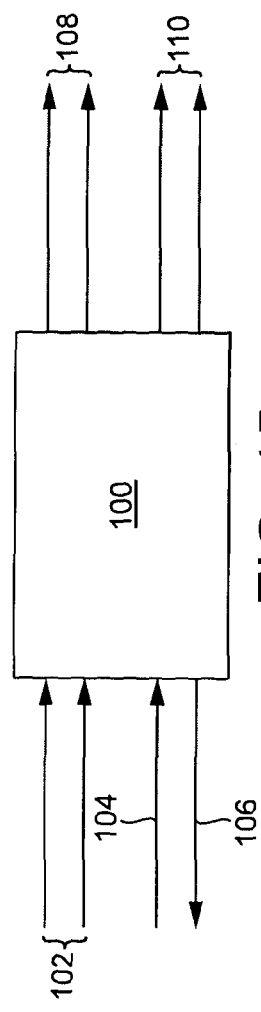
FIG. 14
FIG. 15

LOCK ASSEMBLY

FIELD OF THE INVENTION

The present invention relates to a lock assembly for use in automotive transmission systems, and also in industrial and other off-highway transmission systems. More particularly, it relates to a lock assembly suitable for selectively locking the rotational position of a shaft or other rotating component.

BACKGROUND OF THE INVENTION

Lock mechanisms, such as the park lock of a vehicle, are often manually operated. However, this means that they may be subject to abusive treatment by an operator. For example, if engagement is attempted at high vehicle speeds, the loads through the lock components and their mountings can be excessive. Also, manually-operated locks tend to require detailed dynamic analysis, testing and development to ensure that the components are sufficiently durable.

Electrically-operated park locks can significantly reduce the requirement for detailed analysis and testing of their components, as their abusive operation can be prevented by their electrical control system. They must though be configured in such a way that the park lock is engaged and the associated shaft locked when power to the vehicle is disconnected. In the case of a system actuated by a solenoid, it must therefore be configured so that the lock is engaged when the solenoid is de-energised. This means that electrical power is required at all times during normal vehicle operation in order to keep the park lock disengaged. Constant operation of the electrical system of the lock is a constant drain on the vehicle power source and can also compromise the durability of the brake owing to the associated heat generation.

An electrically-operated system may also be powered by a motor. This may avoid the need for constant power for the lock to remain disengaged during vehicle use. However, the size of the motor may cause packaging issues and additional cost may be involved in adapting a motor to the vehicle's mechanical system.

SUMMARY OF THE INVENTION

The present invention provides a lock assembly for selectively locking the rotational position of a rotatably mounted object such as a shaft, comprising:
- an actuator having an impeller movable between two rest positions by energising the actuator, wherein the impeller is retained in each of the two rest positions by passive magnetic forces generated by the actuator;
- a locking arrangement switchable between a first configuration in which rotation of said shaft is unimpeded by the locking arrangement and a second configuration in which continuous rotation of said shaft is blocked by the locking arrangement; and
- a linkage between the impeller and the locking arrangement, wherein the assembly is arranged such that in one of the impeller rest positions, the locking arrangement is in its first configuration and said shaft is freely rotatable, and in the other of the impeller positions, the locking arrangement is urged towards and becomes locked in its second configuration.

As the actuator impeller is held in position by passive magnetic forces generated by the actuator, continuous or extended application of electrical current to the actuator is not required. This considerably reduces the energy consumption of the device and avoids other electrical issues associated with a constantly powered electrical device.

As the lock assembly is electrically powered, it is possible to operate it in conjunction with a control system that prevents engagement in hazardous situations or conditions that will cause damage to components. This reduces the need for extensive analysis and testing of its mechanical components relative to a manually-operated lock.

Furthermore, shift cable insulation issues that may arise with manually-operated park brake installations are avoided. Avoiding the need for a shift cable also removes the associated noise and vibration transmission issues, and reduces the cost and weight of the park lock assembly.

A lock assembly according to the present invention may be small, lightweight and have a low part count relative to a motor-driven manually-operated system.

The linkage of the assembly may be arranged such that when the impeller moves into its other rest position, the linkage resiliently urges the locking arrangement towards its second configuration. A portion of the linkage may be resiliently urged against the locking arrangement to urge it towards its second configuration. This resilient urging force may be provided by a resiliently compressible component or a resiliently extensible component, with the force being exerted due to compression or extension of the component, respectively. For example it may be a spring such as a coil spring.

The linkage may be arranged such that the locking arrangement is urged towards its second configuration when the impeller is in its other rest position. This compliance is beneficial for an actuator which maintains this impeller position with passive magnetic forces. This is because, even if the locking arrangement does not move initially into its second configuration, the impeller is able to move fully into its rest position where it is firmly held without requiring additional electrical energy input. The linkage accommodates the fact that the locking arrangement is out of its second configuration, and the arrangement continues to be urged towards that configuration without additional power input.

The linkage may be arranged such that when the locking arrangement is in its second configuration, blocking further rotation of the shaft, the linkage prevents the locking arrangement from moving out of its second configuration. In this way, as well as transferring motion of the impeller to the locking arrangement, the linkage also effects locking of the locking arrangement in its second configuration.

In a preferred embodiment, one of the linkage and the locking arrangement defines a cam surface and the other defines a cam follower which are resiliently urged together when the impeller moves into its other rest position.

The cam surface and cam follower may be arranged such that after the locking arrangement has been urged into it second configuration, it is prevented from moving out of its second configuration by the interaction between the cam surface and the cam follower.

The locking arrangement may comprise a pawl for engagement with a toothed circumferential surface which rotates with the shaft. A surface which rotates with the shaft (in this and other embodiments) may be provided by a wheel or other member mounted on the shaft, or in the form of a surface defined by the shaft itself for example.

In preferred embodiments, the impeller is switchable between the two rest positions by application of a single input pulse to the actuator. Thus, a minimal amount of electrical energy is required to achieve engagement or disengagement of the lock. The actuator is preferably a bistable actuator switchable between two stable rest positions.

The actuator may include an energy storage arrangement for mechanically storing potential energy as the impeller moves into its other rest position, and releasing this stored energy to the impeller as it moves away from its other position. Preferably, such an energy storage arrangement is only associated with the other rest position of the impeller.

The invention further provides a lock system including a lock assembly as described herein and a control arrangement for controlling operation of the lock assembly in response to input signals initiated by a user.

BRIEF DESCRIPTION OF THE DRAWINGS

Embodiments of the invention will now be described by way of example and with reference to the accompanying schematic drawings, wherein:

FIG. 14 shows a cross-sectional side view, an end view and a side view of the opposite side of an actuator for an assembly embodying the invention which includes integrated power and control electronics;

FIG. 15 is a diagram illustrating the inputs and outputs to the integrated controller shown in FIG. 14;

DETAILED DESCRIPTION OF THE INVENTION

Figure 1:
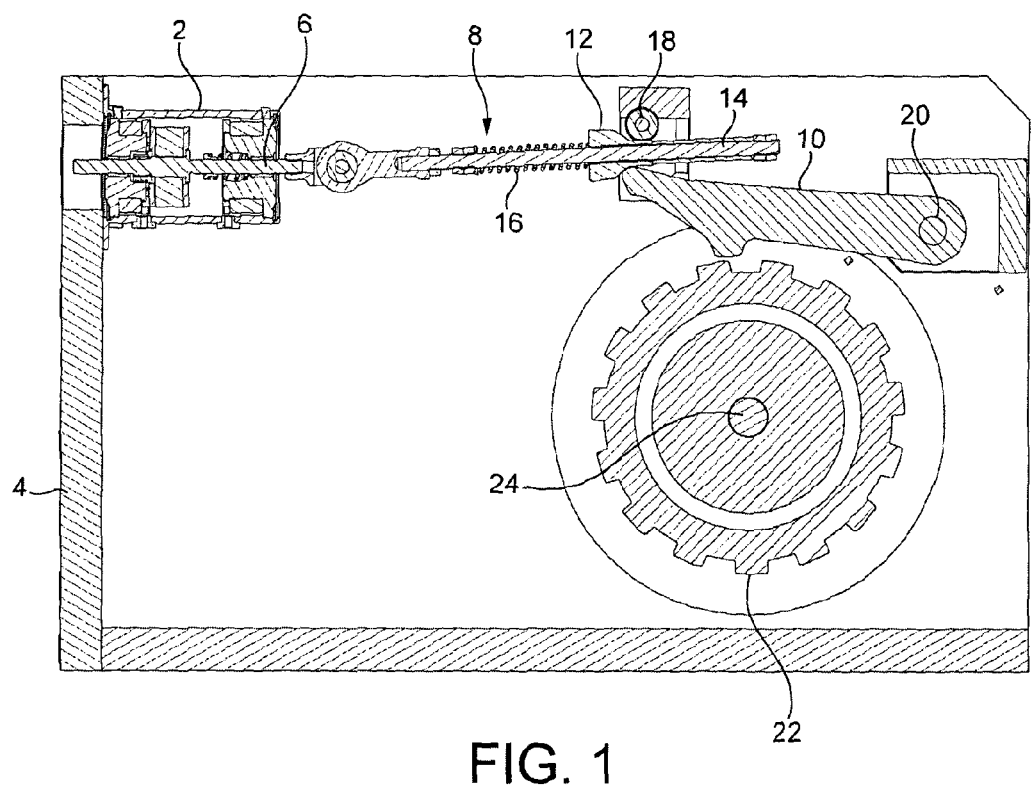
FIG. 1 is a cross-sectional side view of a first lock assembly embodying the invention in its disengaged position.

In the embodiments of the invention shown in the drawings, a bistable linear actuator (for example as described in the present applicant's United Kingdom Patent Publication Nos. 2342504 and 2380065, International Patent Publication No. WO 2010/067110, and U.S. Pat. No. 6,598,621, the contents of which are incorporated herein by reference) is combined with a compliant linkage, and a locking arrangement to create a device which can selectively lock a rotatable shaft or other rotatably mounted object.

When the actuator is in one rest position, the shaft is free to rotate, and in its other rest position, the shaft becomes locked against further rotation. When used in an automotive or off-highway transmission, the device may be employed to lock one of the shafts directly connected to wheels. For example, it may be deployed as a park lock of the type required with automotive transmissions by legislation in order to provide a positive method of stopping the vehicle from rolling when the power source to the lock is disconnected. The lock assembly may also be used as a shaft lock in industrial machinery that uses rotating components.

Figure 2:
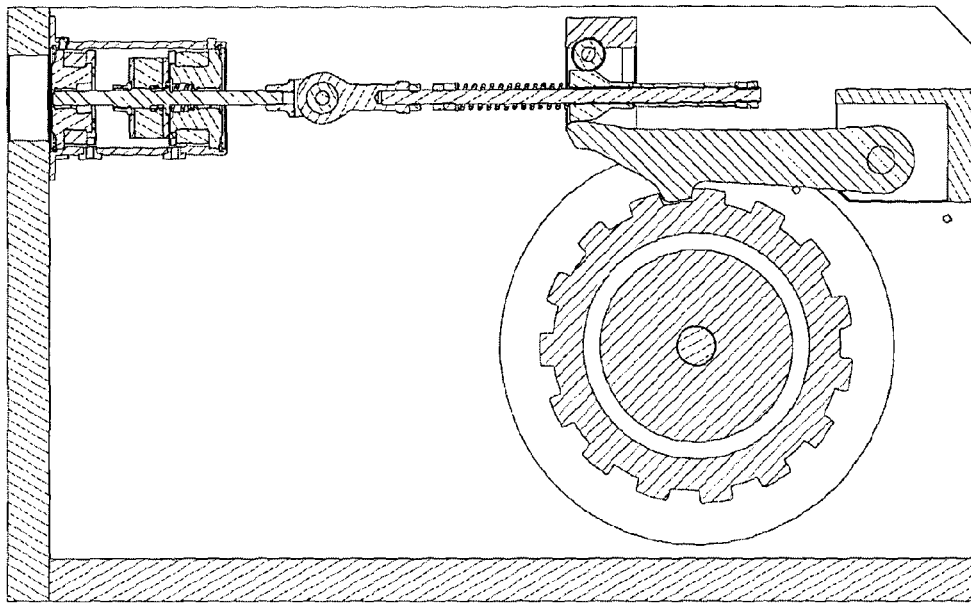
FIGS. 2 and 3 are views similar to that of FIG. 1, but with the park lock in its engaged and locked positions, respectively.
Figure 3:
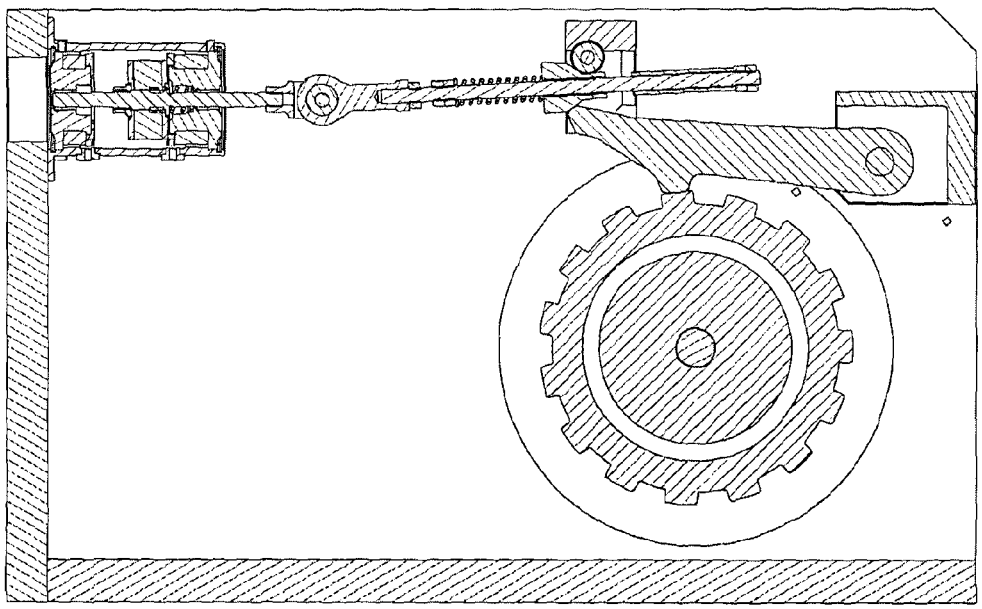

A first embodiment is depicted in FIGS. 1 to 3. As shown in FIG. 1, a bistable actuator 2 is mounted on a transmission casing 4. The impeller or actuation rod 6 of the actuator is coupled to a linkage 8. The linkage is in engagement with a locking arrangement in the form of a pawl 10.

Linkage 8 includes a cam 12 slidably mounted on a linear support 14. Cam 12 is coupled to a cam spring 16. Cam spring 16 acts to push the cam along support 14 in a direction away from the actuator 2. Cam 12 is in contact with a pin or roller 18 and the distal end of pawl 10. Pawl 10 is pivotably mounted on a pivot 20 supported on the transmission casing. Pawl 10 is resiliently biased against the cam 12 by a biasing arrangement not shown in FIG. 1.

In the cross-sectional side view of FIG. 1, it can be seen that cam 12 defines a tapered surface having two opposite sides with their spacing decreasing with distance from the actuator. This tapered surface joins to a portion of the cam having substantially parallel sides in cross-sectional side view which is closer to the actuator. The cam also has another portion located further from the actuator than the tapered portion which again has substantially parallel sides in cross-sectional side view as can be seen in FIG. 1. This narrower, parallel sided portion is located between pawl 10 and pin 18 in the disengaged position shown in FIG. 1. In this configuration, pawl 10 is disengaged from a toothed wheel 22 mounted on a shaft 24 in a fixed position relative to the shaft.

In FIG. 1, the actuator is shown in one of its two stable rest positions, in which the impeller is retracted away from pawl 10. In this configuration, the pawl is disengaged from the toothed wheel.

As shown in FIG. 2, when the actuator is energised by application of a suitable input pulse, the impeller 6 is switched from one stable rest position to the other which is closer to pawl 10. This causes the linkage to push cam 12 through the gap between pawl 10 and pin 18. This causes the pawl and pin to run over their respective tapered surfaces on the cam 12, causing the cam to push the pawl downwardly into full engagement with a space between adjacent teeth on the toothed wheel 22. The pawl thereby prevents the shaft from rotating, locking it in position. The actuator is held in this position by passive magnetic forces and maintains the cam in its locking position via spring 16.

If the actuator moves to the engaged position and the pawl is prevented from engaging with a gap between adjacent teeth on the toothed wheel because it contacts the upper surface of one of the teeth, the actuator remains in its engaged position as shown in FIG. 3. The cam spring urges the cam in the direction of engagement. Then, any subsequent rotation of the transmission shaft will cause the biased cam to force the pawl into engagement with the very next tooth space on the wheel so that the shaft becomes locked. The toothed wheel and pawl are configured such that the pawl defines a wheel engagement portion that is complementary to each tooth space on the wheel.

Figure 4:
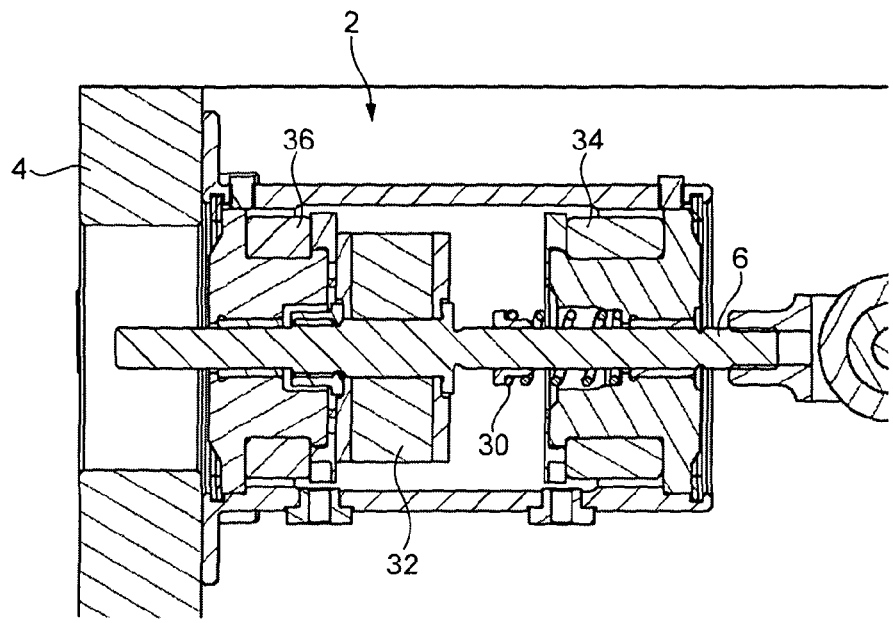
FIGS. 4 and 5 are enlarged cross-sectional side views of the actuator shown in FIGS. 1 to 3 in its disengaged and engaged configurations, respectively.
Figure 5:
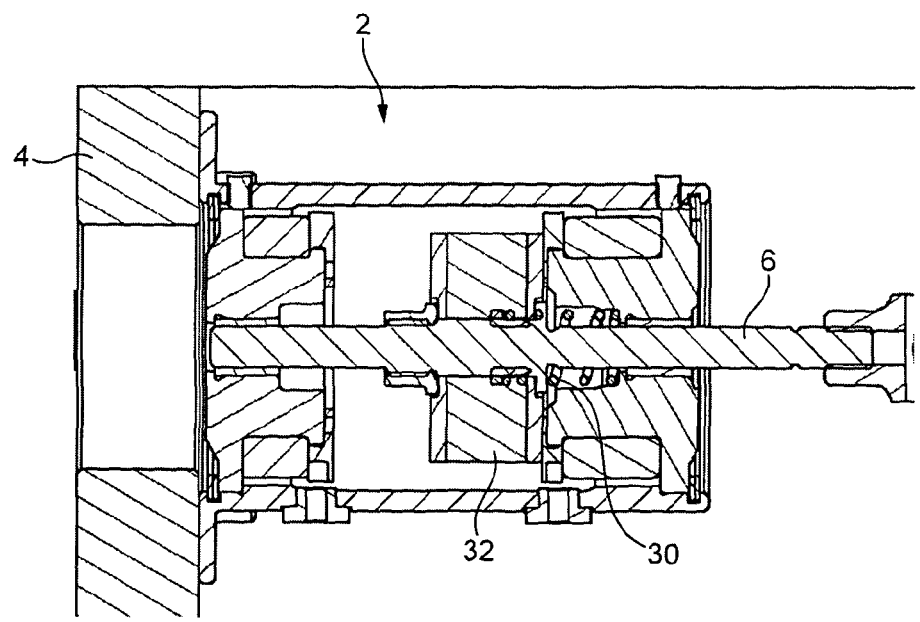

The configurations of the actuator in each rest position corresponding to when the brake assembly is in its disengaged and engaged arrangements are shown in FIGS. 4 and 5, respectively. The actuator includes a coil spring 30 which engages the armature 32 of the actuator as it moves into the configuration shown in FIG. 5. This stores mechanical potential energy in the spring which is then subsequently employed to accelerate the armature away from that position when the actuator is switched into its other configuration.

Preferably, a greater amount of energy is stored during movement of the assembly into the lock-engaged configuration, relative to that stored when the assembly moves into the disengaged configuration. Thus in the embodiment illustrated, a coil spring is only provided on one side of the actuator. In other implementations, energy storage arrangements with different or substantially equal properties may be provided on respective sides of the actuator.

In embodiments where a greater amount of energy is stored in the lock-engaged position of the actuator (relative to its lock-disengaged position), the actuation coil 34 adjacent to the lock-engaged position preferably has a greater number of turns than the other actuation coil 36, as shown in FIG. 4. This provides greater force to shift the armature and therefore ensure the transition of the locking arrangement to its disengaged configuration.

More energy is preferably stored when the assembly moves to engage the lock, as the extra energy is then employed to provide the greater force needed to disengage the cam from between pin 18 and pawl 20.

Whilst the embodiment illustrated in FIGS. 1 to 3 involves cam motion in a direction tangential to the circumferential surface of the shaft, it will be appreciated that other configurations may be adopted. For example, the cam motion could alternatively be in a direction parallel to the axis of the shaft.

Figure 6:
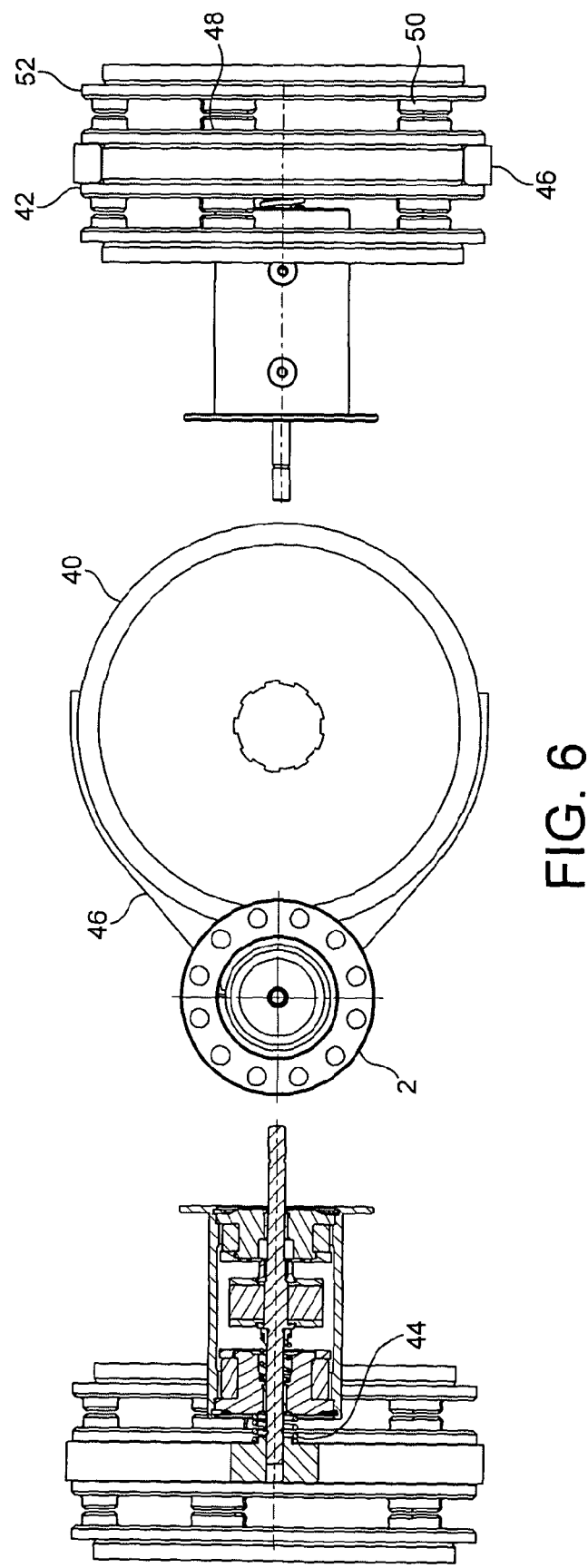
FIG. 6 shows a cross-sectional side view of one side of a second lock assembly embodying the invention, along with an end view and a view of the opposite side.
Figure 7:
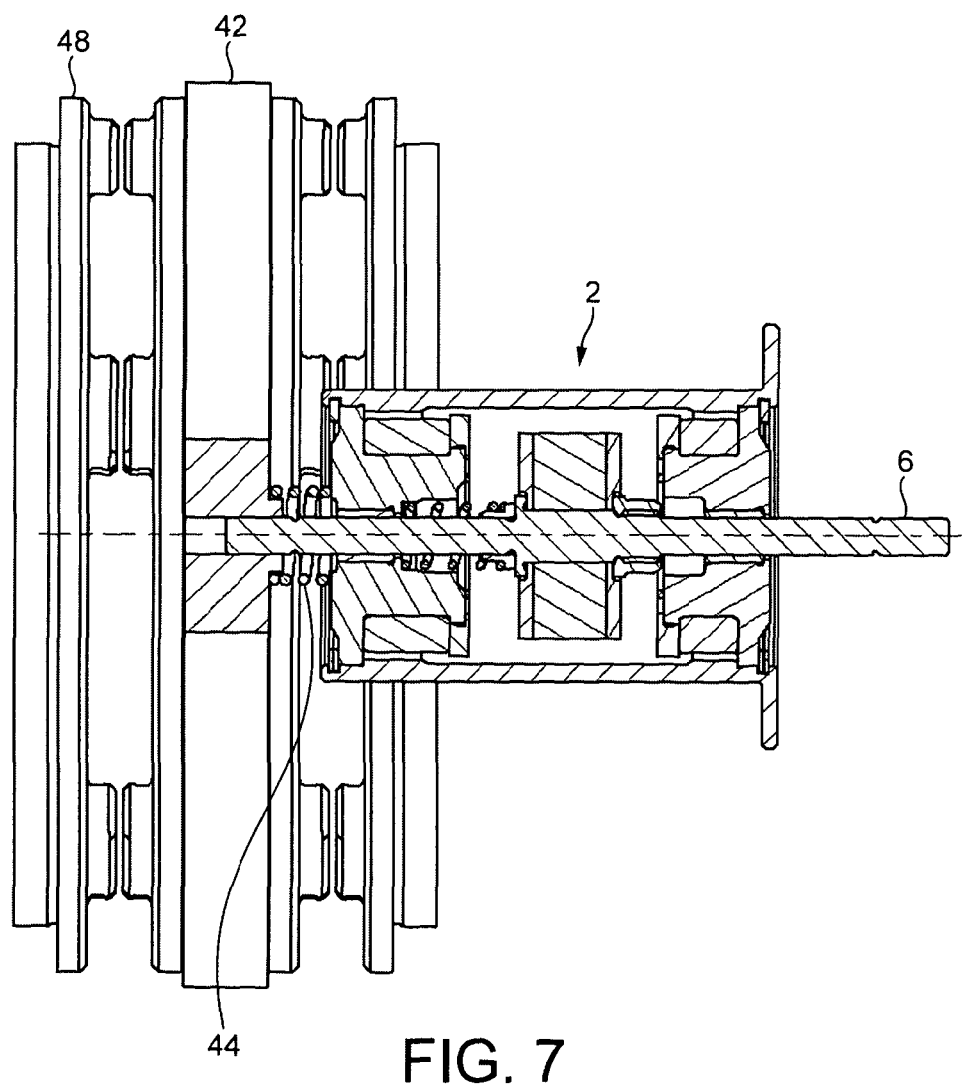
FIG. 7 is an enlarged version of the cross-sectional side view shown in FIG. 6.

FIGS. 6 and 7 relate to a second assembly embodying the present invention. In this implementation, the locking arrangement is in the form of a "dog clutch" 40. In this implementation, the impeller 6 of actuator 2 is coupled to a sliding sleeve 42 of the clutch via a resilient coupling, in the form of an external spring 44 in combination with a shift fork 46.

Sliding sleeve 42 carries a plurality of axially extending dog teeth on each of its transverse faces. Facing these teeth are similar teeth 50 on an opposing face of an engagement ring 52.

When the locking arrangement is in its disengaged position, the dog teeth 48 of the sliding sleeve are not in contact with the engagement ring dog teeth 50. The sliding sleeve and the engagement ring are free to rotate independently of each other.

When the impeller moves into its lock engagement position, external spring 44 is compressed so as to exert an axially directed force on the shift fork 46. This in turn pushes the sliding sleeve towards the engagement ring. When the dog teeth of the sliding sleeve align with gaps between the dog teeth of the engagement ring, they are urged together by the shift fork so that relative rotation is only permitted through a small angle. Where the teeth on the sliding sleeve initially sit on top of the teeth of the engagement ring, energy to shift the sliding sleeve into its locking position is stored by the external spring until the sliding sleeve can move into engagement with the engagement ring. Thus, once the impeller has moved into its lock engagement position, no further electrical energy is needed to complete transfer of the locking arrangement into its locked configuration. In this configuration, continued rotation of the shaft coupled to the engagement ring will be blocked by the lock assembly.

Figure 8:
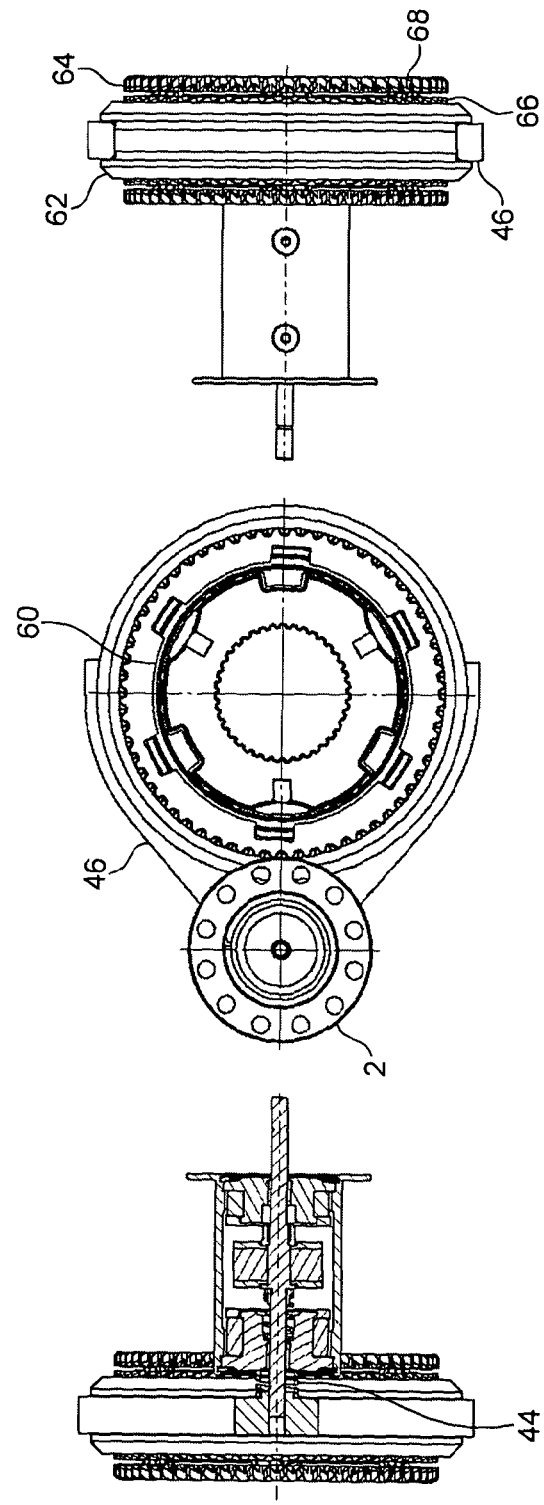
FIG. 8 shows a cross-sectional side view of one side of a third lock assembly embodying the invention, along with an end view and a view of the opposite side.
Figure 9:
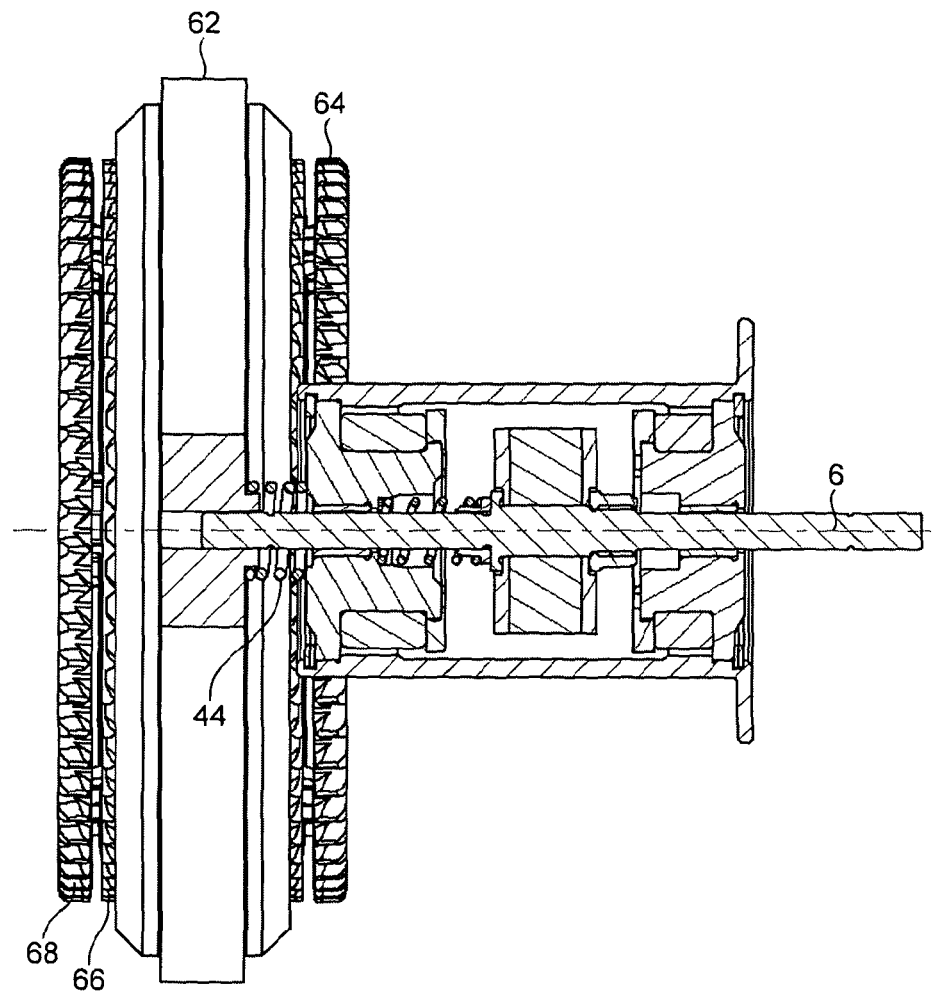
FIG. 9 is an enlarged version of the cross-sectional side view shown in FIG. 8.

A third embodiment similar to that of FIGS. 6 and 7 is shown in FIGS. 8 and 9. In this case, the locking arrangement is in the form of a synchroniser 60. Sliding sleeve 62 and engagement ring 64 have respective continuous sets of complementary teeth 66 and 68 respectively. It operates in a similar manner to the embodiment of FIGS. 6 and 7.

In the embodiments of FIGS. 6 to 9, one end of the spring 44 is coupled to and moves with the actuation rod 6 of the actuator. The other end bears against the shift fork 46 when the actuator is moved into its engaged or locking position. Fork 46 in turn acts on the sliding sleeve 62.

Figure 10:
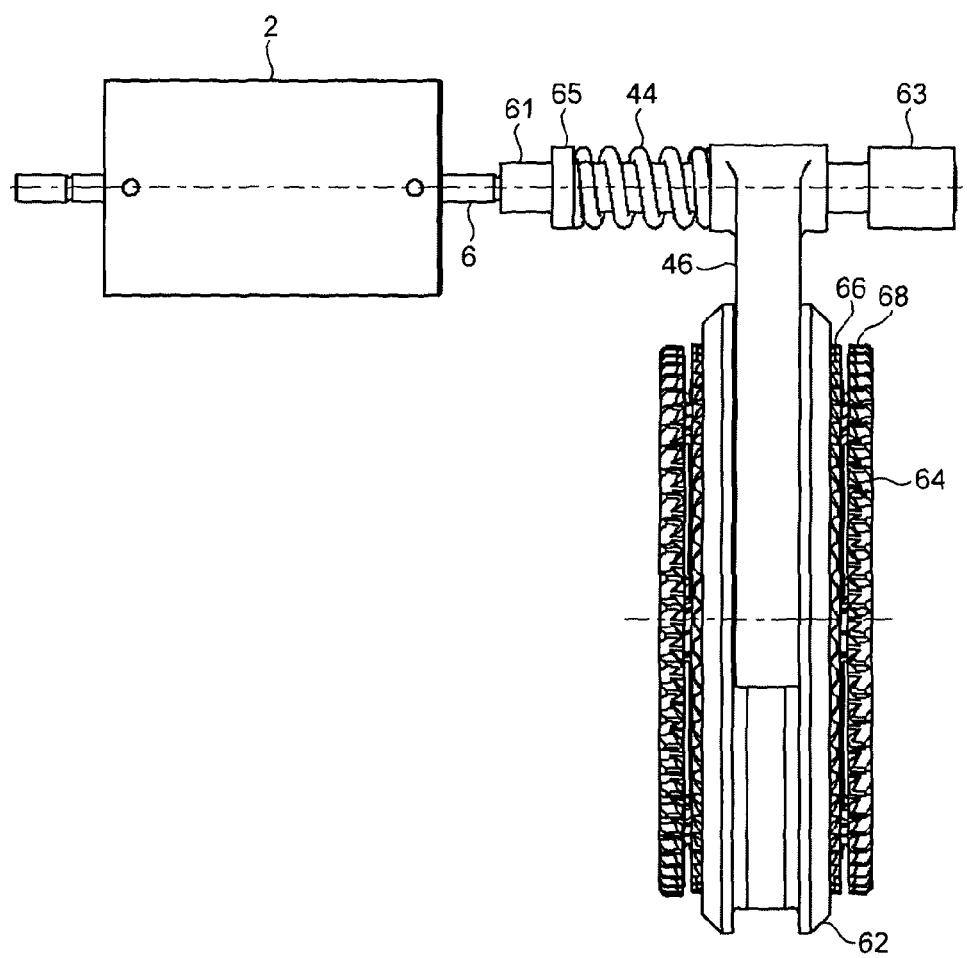
FIGS. 10 and 11 show a plan view and a cross-sectional side view, respectively, of a different linkage configuration.
Figure 11:
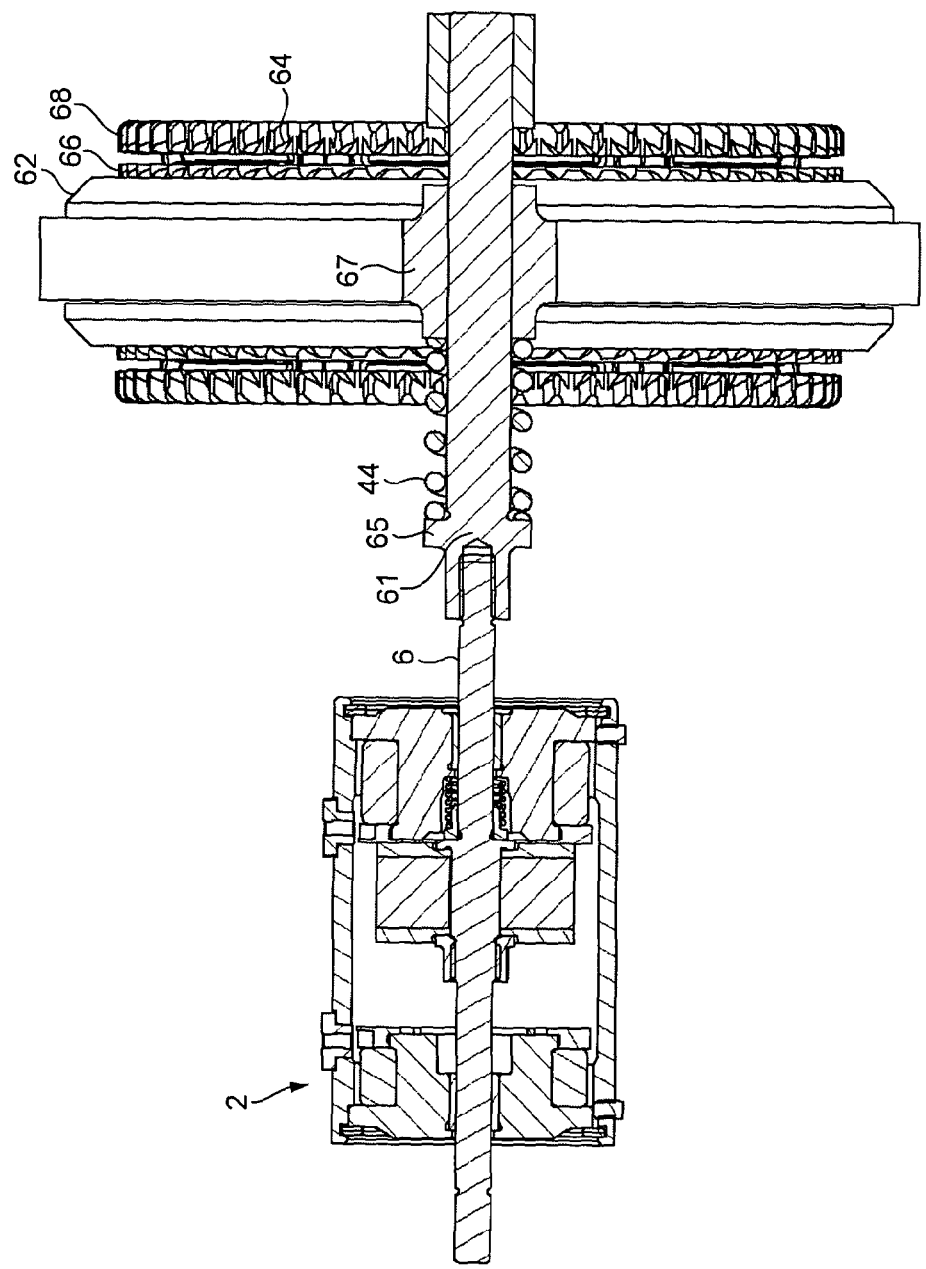

Variations on the linkage between the actuator and the locking arrangement shown in FIGS. 8 and 9 are illustrated in FIGS. 10 and 11.

In FIGS. 10 and 11, the actuation rod 6 is connected to an elongate rail 61 which is slidingly received by an end stop 63. A shift fork 46 is slidably mounted on the rail. Spring 44 is engaged at one end by a flange 65 provided on the rail 61. When actuator 2 is shifted into its engaged or locking position, the rail is shifted away from the actuator, causing the spring to be urged against shift fork 46.

Figure 12:
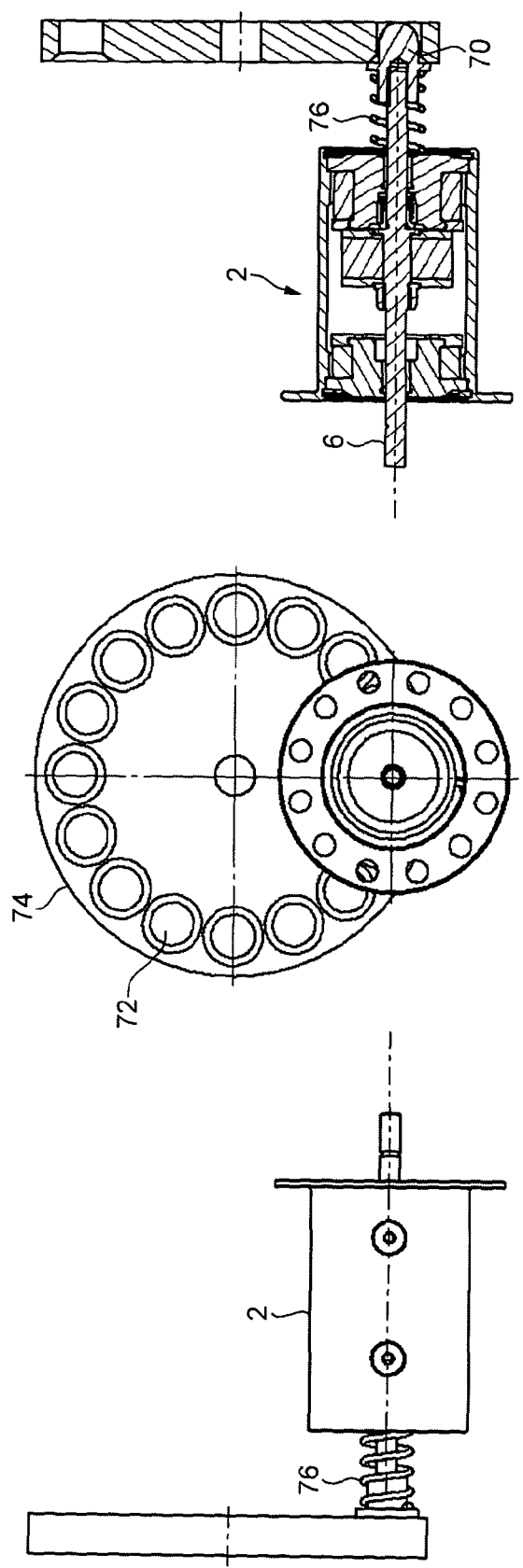
FIG. 12 shows a side view of one side of a fourth lock assembly embodying the invention, along with an end view and a cross-sectional view of the opposite side.

Another lock assembly configuration embodying the present invention is shown in FIG. 12. In this implementation, a round-headed pin 70 is mounted (in a fixed manner or slidable axially) on one end of the impeller 6. A circular arrangement of holes 72 or recesses of a diameter complementary to that of the pin is defined in the face of an engagement disc 74.

When the lock assembly is in its disengaged configuration, the pin and the engagement disc are spaced apart. The engagement disc is free to rotate.

When the actuator impeller is moved into its engagement position, an external spring 76 is urged against pin 70. The head of the pin is then biased against the opposing face of the engagement disc 74 until a hole on the disc rotates into alignment with the pin. The pin is then pushed into the hole via the external spring 76 to restrict further the rotation of the disc.

Figure 13:
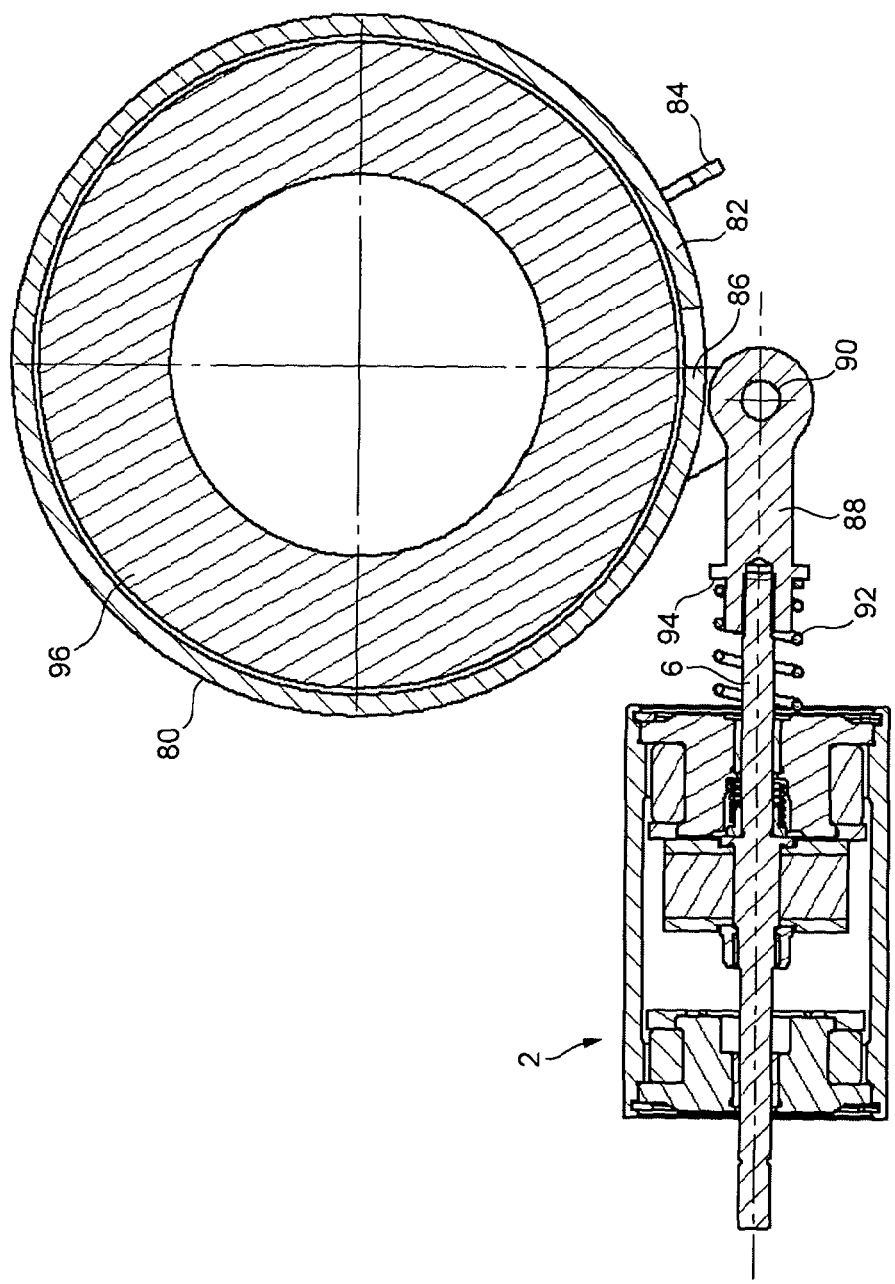
FIG. 13 is a cross-sectional side view of a fifth lock assembly embodying the invention.

A fifth embodiment of the present locking arrangement is depicted in FIG. 13. The impeller 6 of actuator 2 is coupled to a locking arrangement in the form of a band brake 80. The band brake is in the form of a strip of material defining an incomplete circle in side view. One end 82 of the band is coupled to a fixed location, for example provided by a surrounding housing, providing a "ground reaction" 84. The other end 86 of the band is coupled to the impeller 6. This coupling takes the form of a linkage 88 mounted (in a fixed manner or slidable axially) on one end of the impeller and pivotally mounted about a pivot 90 connected to end 86 of the band brake. An external spring 92 is provided between an end face of the actuator housing and an opposed surface 94 defined by linkage 88.

Band brake 80 is provided in concentric alignment with and around an inner rotor 96. When the locking arrangement is in its disengaged configuration, the inner rotor is free to rotate.

When the actuator impeller shifts to its lock engagement position, linkage 88 exerts a tangential force on pivot 90, causing the radius of the band brake 80 to reduce such that it clamps against the outer circumferential surface of inner rotor 96. This serves to slow and then prevent further rotation of the inner rotor.

FIG. 14 illustrates a preferred actuator configuration in which an integrated power electronics and actuator controller module 100 is provided at one end of the actuator housing, with impeller 6 extending through its centre.

Electrical inputs and outputs to and from the controller module are illustrated schematically in FIG. 15. Power is fed to the module along a pair of lines 102. Control signals are fed to and from the module via lines 104 and 106, respectively, which are coupled to an external controller (not shown).

The module governs the operation of the actuator 2 by sending current pulses to each of the pair of coils 34, 36 in the actuator along pairs of lines 108 and 110, respectively.

The control signals may be in analogue, digital or CAN format for example. They may emanate, for example from a vehicle transmission or central vehicle controller for example.

The module 100 may be configured to detect the disposition of the impeller within the actuator and feed this information to the external controller. This position sensing may be achieved for example by monitoring the inductance of the actuator coils, using a Hall sensor. The position of the impeller and armature of the actuator relative to the coils changes the measurable inductance in each coil. Detection of these changes facilitates derivation of the position of the impeller.

The coils of the actuator may be wired together in different embodiments in series, in parallel, or individually.

Figure 17:
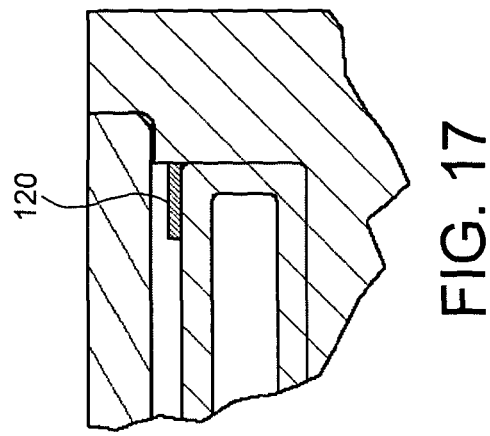
FIGS. 16 and 17 are a cross-sectional side view and an enlarged partial cross-sectional side view respectively of an actuator for use in embodiments of the invention.
Figure 16:
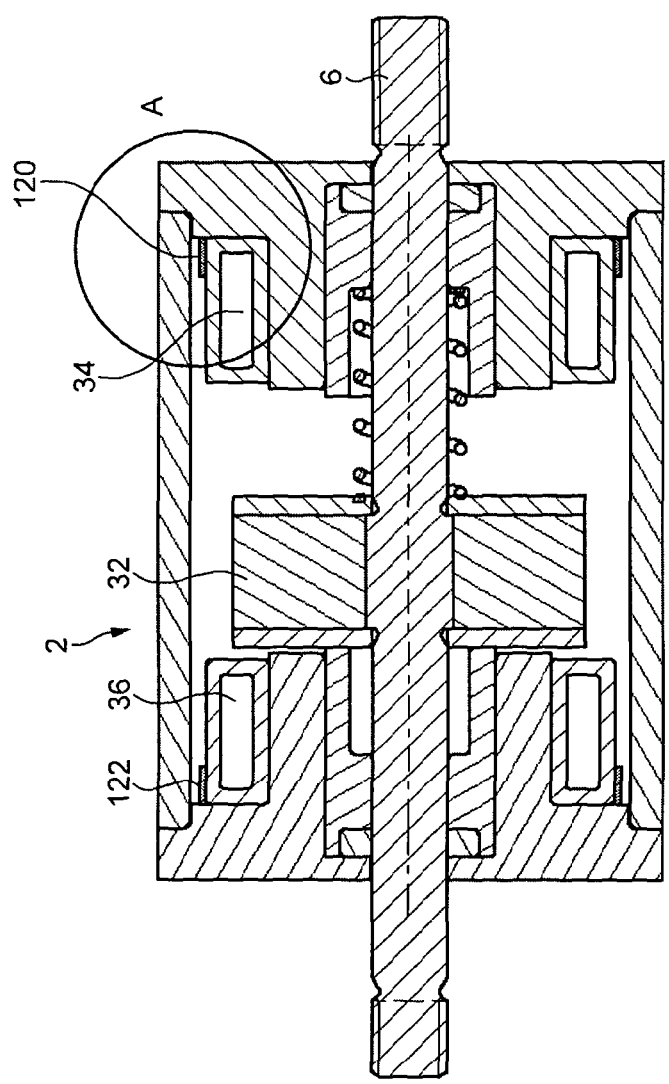

In the actuator configuration shown in FIG. 16, a sensing or search coil 120 is provided in association with actuation coil 34 and similarly a sensing or search coil 122 is provided in association with actuation coil 36. Each search coil is provided coaxially with, and circumferentially around, the respective actuation coil. Region "A" of FIG. 16 is enlarged in FIG. 17.

The amount of flux linking each search coil will be different depending on which stable rest position the armature of the actuator is in. Accordingly, the current induced in each coil is responsive to the armature position, enabling the armature position to be sensed by the external controller.

Electrical energy storage means may be provided in combination with the actuator, for example in the form of capacitors, to provide a local power source.

Depending on the requirements of a particular application, the lock assembly may be configured to revert to a particular configuration upon detection of predetermined external conditions. These conditions may for example be a power supply or other device failure, or detection of a predetermined vehicle speed or location for example. The position reverted to may be the locked configuration or the open configuration depending on the associated conditions. Where a local energy source is provided for the actuator, this switching to a selected position may be driven by the local power source so that it is not dependent on external power sources.

Provision of a dedicated energy source for the actuator may reduce the size of the control cabling leading to the actuator. The source may be embodied by a capacitor connected across each coil of the actuator. Voltage multiplier circuits may be incorporated to increase the speed of response.

Figure 18:
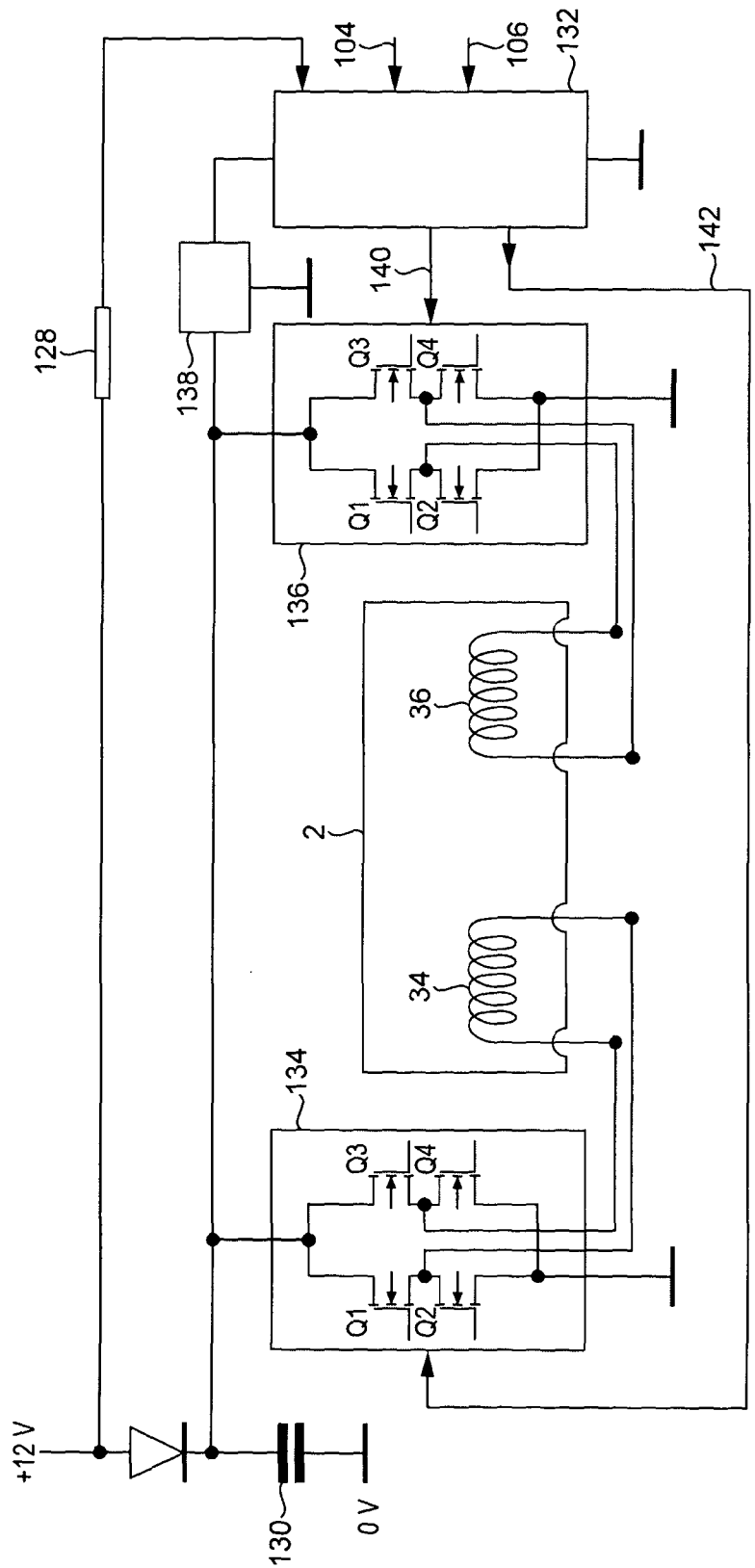
FIG. 18 is a circuit diagram of an electronic driver suitable for operating a bistable actuator in a lock assembly embodying the present invention.

A driver circuit suitable for operating a bistable actuator in a lock assembly embodying the invention is shown in FIG. 18. An actuator 2 having actuation coils 34 and 36 is shown schematically in the centre of the Figure.

Power is supplied in this example from a 12V DC supply via resistor 128. A capacitor 130 provides local power storage, together with voltage regulator circuit 138. Control lines from an external controller are coupled to a local controller in the form of a microprocessor 132. This in turn feeds control currents along lines 140, 142 to the coils via respective H-bridge circuits 134 and 136.

The invention claimed is:

1. A lock assembly for selectively locking the rotational position of a shaft, comprising:
   an actuator having an impeller movable between two rest positions by energising the actuator, wherein the impeller is retained in each of the two rest positions by passive magnetic forces generated by the actuator;
   a locking arrangement switchable between a first configuration in which rotation of said shaft is unimpeded by the locking arrangement and a second configuration in which rotation of said shaft is blocked by the locking arrangement; and
   a linkage between the impeller and the locking arrangement, wherein the assembly is arranged such that in one of the impeller rest positions, the locking arrangement is in its first configuration and said shaft is freely rotatable, and in the other of the impeller rest positions, the locking arrangement is urged towards and into its second configuration, and wherein the linkage is arranged such that when the impeller moves into the other rest position, the linkage resiliently urges the locking arrangement towards its second configuration.

2. An assembly of claim 1, wherein the linkage is arranged such that when the locking arrangement is in its second configuration, the linkage prevents the locking arrangement from moving out of its second configuration.

3. An assembly of claim 1, wherein one of the linkage and the locking arrangement defines a cam surface and the other defines a cam follower which are resiliently urged together when the impeller moves into its other rest position.

4. An assembly of claim 3, wherein after the locking arrangement has been urged into its second configuration by the interaction between the cam surface and cam follower, it is prevented from moving out of its second configuration by the interaction between the cam surface and cam follower.

5. An assembly of claim 1, wherein the locking arrangement comprises a pawl for selective engagement with a toothed circumferential surface which rotates with the shaft.

6. An assembly of claim 1, wherein the locking arrangement comprises a first ring of teeth for selective engagement with a second ring of teeth which rotates with the shaft.

7. An assembly of claim 6, wherein the locking arrangement is in the form of a dog clutch.

8. An assembly of claim 6, wherein the locking arrangement is in the form of a synchroniser.

9. An assembly of claim 1, wherein the locking arrangement comprises a pin for selective engagement with one of a ring of holes defined by a surface which rotates with the shaft.

10. An assembly of claim 1, wherein the locking arrangement comprises a band brake for engagement with a surface which rotates with the shaft.

11. An assembly of claim 1, wherein the impeller is switchable between the two rest positions by application of a single input pulse to the actuator.

12. An assembly of claim 1, wherein the actuator includes an energy storage arrangement for storing energy as the impeller moves into its other rest position and releasing the stored energy to the impeller as it moves away from its other rest position, but is without an energy storage arrangement for storing energy as the impeller moves into said one rest position.

13. An assembly of claim 1 including a sensing arrangement for detecting the position of the impeller and/or the configuration of the locking arrangement.

14. An assembly of claim 1, wherein the sensing arrangement is configured to detect whether the impeller has reached its other rest position.

15. An assembly of claim 1, wherein the sensing arrangement is responsive to the inductance of a coil or the coils in the actuator.

16. An assembly of claim 1, wherein the sensing arrangement is configured to detect whether the locking arrangement has reached its second configuration.

17. An assembly of claim 1 including a back-up arrangement for mechanically urging the locking arrangement towards and into its second configuration.

18. An assembly of claim 1 including a fail-safe arrangement for generating an input pulse to send to the actuator to move the locking arrangement to its second position in response to detection of a predetermined failure condition.

19. An assembly of claim 1 including an electrical energy storage arrangement for generating an input pulse to switch the actuator in response to a trigger signal.

20. A lock system including a lock assembly of claim 1 and a control arrangement for controlling operation of the lock assembly in response to input signals triggered by a user.

* * * * *